United States Patent [19]
Näslund et al.

[11] Patent Number: 5,771,763
[45] Date of Patent: Jun. 30, 1998

[54] CUTTING TOOL INSERT

[75] Inventors: Jonas Näslund, Sandviken; Anders Jonsson, Gävle, both of Sweden

[73] Assignee: Sandvik AB, Sandviken, Sweden

[21] Appl. No.: 826,407

[22] Filed: Mar. 24, 1997

Related U.S. Application Data

[63] Continuation of Ser. No. 326,933, Oct. 21, 1994, abandoned.

[30] Foreign Application Priority Data

Oct. 21, 1993 [SE] Sweden .................................. 9303471

[51] Int. Cl.⁶ ..................................................... B23B 27/22
[52] U.S. Cl. ............................. 82/1.11; 407/113; 407/114
[58] Field of Search ................................... 407/113, 118, 407/119, 120, 114; 30/346.55, 357; 82/1.11

[56] References Cited

U.S. PATENT DOCUMENTS

| | | |
|---|---|---|
| D. 340,464 | 10/1993 | Markusson et al. . |
| D. 344,276 | 2/1994 | Markusson et al. . |
| D. 347,642 | 6/1994 | Lindberg . |
| D. 348,891 | 7/1994 | Markusson et al. . |
| D. 350,549 | 9/1994 | Lindstedt et al. . |
| 4,277,283 | 7/1981 | Tobioka et al. . |
| 4,548,768 | 10/1985 | Ramser et al. . |
| 4,610,931 | 9/1986 | Nemeth et al. . |
| 4,649,084 | 3/1987 | Hale et al. . |
| 4,705,124 | 11/1987 | Abrahamson et al. . |
| 4,743,515 | 5/1988 | Fischer et al. . |
| 4,812,370 | 3/1989 | Okada et al. . |
| 4,830,930 | 5/1989 | Taniguchi et al. . |
| 4,985,070 | 1/1991 | Kitamura et al. . |
| 5,006,020 | 4/1991 | Roos . |
| 5,106,674 | 4/1992 | Okada et al. . |
| 5,246,315 | 9/1993 | Hansson et al. . |
| 5,250,367 | 10/1993 | Santhanam et al. . |
| 5,266,388 | 11/1993 | Santhanam et al. . |
| 5,593,255 | 1/1997 | Satran et al. .......................... 407/113 |

FOREIGN PATENT DOCUMENTS

| | | |
|---|---|---|
| 61-219503 | 9/1986 | Japan . |
| A-61219503 | 9/1986 | Japan . |
| 63-057102 | 3/1988 | Japan . |
| A-63057102 | 3/1988 | Japan . |

*Primary Examiner*—Daniel W. Howell
*Assistant Examiner*—Mark Williams
*Attorney, Agent, or Firm*—Burns, Doane, Swecker & Mathis, L.L.P.

[57] ABSTRACT

An edge rounded cutting tool insert which shows less flank wear in the nose area and improved toughness behavior on the main cutting edge. The improved toughness and decreased flank wear is achieved by decreasing the W/H ratio and increasing H from the nose area to the middle of the main cutting edge wherein W is the width of edge rounding of the cutting edge along the rake face and H is the width of edge rounding of the cutting edge along the clearance face.

19 Claims, 2 Drawing Sheets

CUTTING TOOL INSERT

This application is a continuation of application Ser. No. 08/326,933, filed Oct. 21, 1994, now abandoned.

FIELD OF THE INVENTION

The invention relates to a cutting tool insert which through a special microgeometry has obtained new and improved properties.

BACKGROUND OF THE INVENTION

Inserts for chip forming machining consist of at least one main cutting edge and a connecting nose (corner). Such inserts are produced by powder metallurgical methods of milling, pressing and sintering. As a result of the pressing operation the inserts obtain rather sharp edges. However, sharp edges break too easily when used. After the sintering the inserts are therefore subjected to an edge rounding operation including lapping, tumbling, brushing or blasting.

The edge rounding can be described by the W/H ratio where W is the width of the edge rounding along the rake face and H is the width of the edge rounding along the clearance face. The edge rounding can also be defined in terms of the radii on the rake face, $R_2$, and on the clearance face, $R_1$.

When lapping, tumbling or brushing are used, the edge rounding normally becomes larger in the nose area than along the main cutting edge whereas edge rounding by blasting is difficult to control with desirable accuracy. In the prior art, the W/H-value seems to be essentially constant around the edge whereas the H-value varies. Moreover, no particular microgeometry seems to be aimed at.

SUMMARY OF THE INVENTION

According to the invention, an edge rounded cutting tool insert is provided which has improvements in toughness and wear resistance. The cutting tool insert includes at least one main cutting edge and a connecting nose area wherein W is a width of edge rounding along the rake face and H is a width of edge rounding along a clearance face, H and W being proportioned so that a ratio W/H in the nose area is at least 1.25 times larger than the W/H ratio in a middle of the main cutting edge and the H in the middle of the main cutting edge is at least 1.1 times larger than the H in the nose area.

According to various aspects of the invention, the cutting tool insert can include the following features. For instance, the cutting tool insert can have a surface zone with an increased binder phase content, e.g., the cutting edge can have the increased binder phase content. The W/H ratio in the nose area can range from 1.5 to 2.3 and depending on the intended machining operation, H in the nose area can have various values such as 30<H<100 $\mu$m, 30<H<50 $\mu$m, 40<H<80 $\mu$m, or 60<H<100 $\mu$m. The W/H ratio in the middle of the main cutting edge can range from 0.8 to 1.6 or 1.0 to 1.4 and the H in the middle of the main cutting edge can have various values such as 50<H<300 $\mu$m, 50<H<100 $\mu$m or 100<H<300 $\mu$m. The edge rounding on the clearance face can have a radius $R_1$ of 20 to 60 $\mu$m, 20 to 25 $\mu$m, 25 to 50 $\mu$m, or 30 to 60 $\mu$m. The edge rounding on the rake face can have a radius $R_2$ of 100 to 250 $\mu$m. Also, a transition between microgeometry in the nose area and microgeometry in the main cutting edge can extend along 30% of the main cutting edge, e.g. along at least 1 mm of the main cutting edge.

The invention also provides a method of machining a metal workpiece such as stainless steel with an edge rounded cutting tool insert comprising at least one main cutting edge and a connecting nose area, the main cutting edge having a width W of edge rounding along a rake face and a width H of edge rounding along a clearance face, a W/H ratio in the nose area of at least 1.25 times larger than the W/H ratio in a middle of the main cutting edge and the H in the middle of the main cutting edge of at least 1.1 times larger than the H in the nose area, the method comprising contacting the workpiece with the main cutting edge of the cutting tool insert and moving the workpiece relative to the cutting tool insert such that the main cutting edge removes metal from the workpiece.

DETAILED DESCRIPTION OF THE PREFERRED EMBODIMENTS

According to the invention, it has been found that if a cutting insert is manufactured in such a way that the W/H ratio decreases and H increases from the nose area to the middle of the main cutting edge, less flank wear in the nose area and improved toughness behavior on the main cutting edge are obtained. These favorable properties are particularly pronounced when machining steel or stainless steel.

Figure 1:
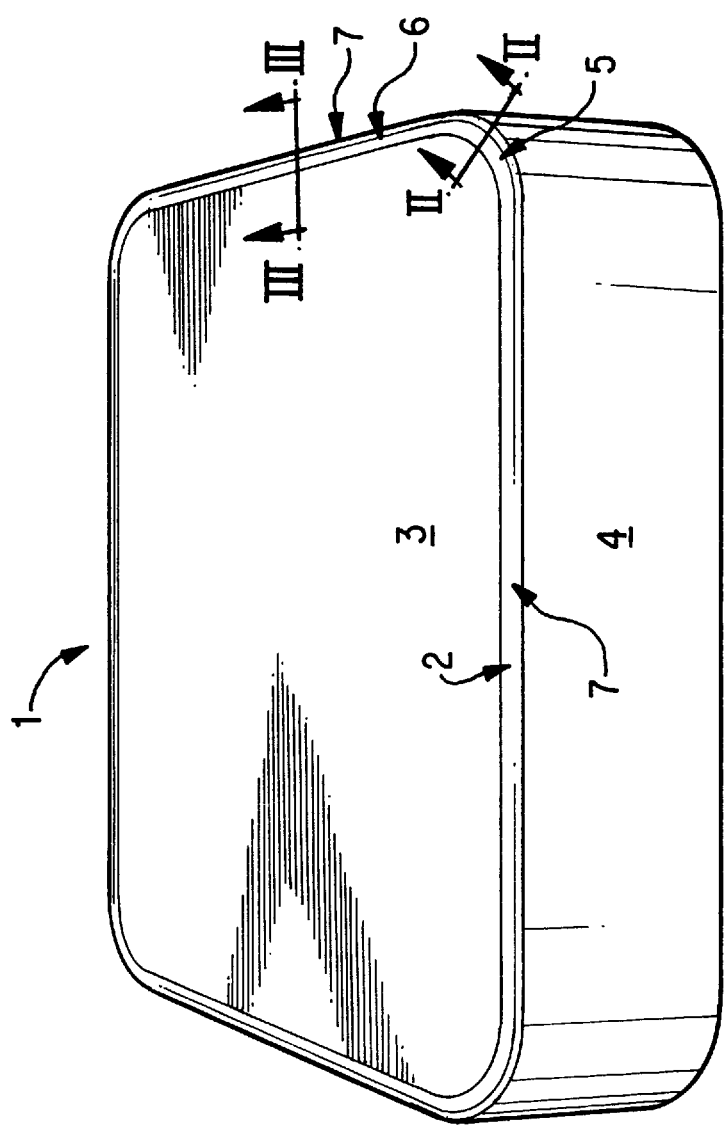
FIG. 1 shows a perspective view of a cutting insert in accordance with the invention after an edge rounding operation.
Figure 3:
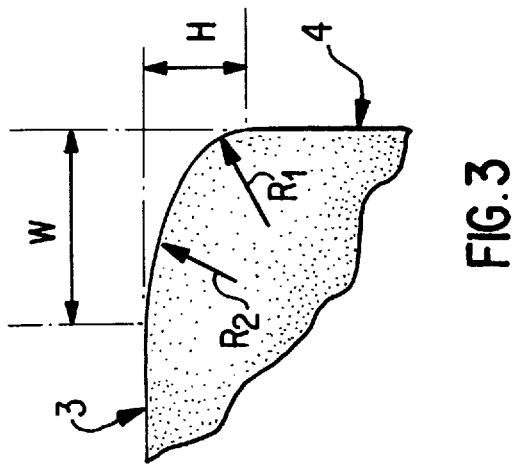
FIG. 3 shows a cross section of the insert of FIG. 1 along the line III—III.
Figure 2:
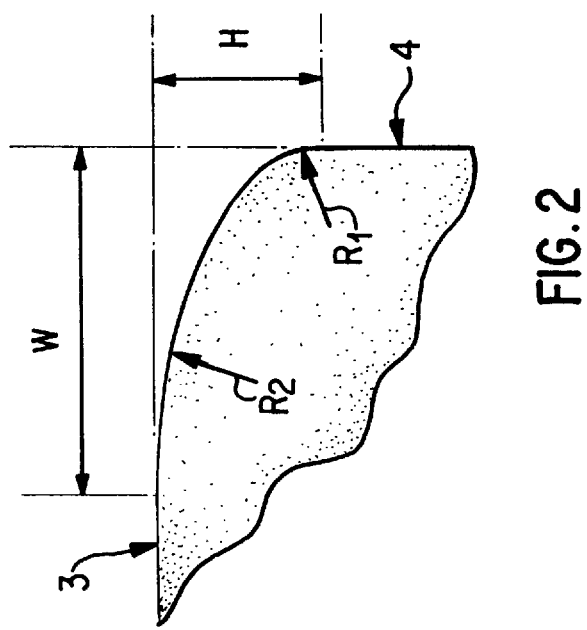
FIG. 2 shows a cross section of the insert of FIG. 1 along the line II—II.

As shown in FIG. 1, a cutting tool insert 1 includes a cutting edge 2, between rake face 3 and clearance face 4 and a nose area or corner 5 between cutting edge 2 and another cutting edge 6. According to the invention, W/H decreases from the nose area 5 to the middle 7 of the cutting edge. The W/H ratio in the nose area 5 (FIG. 2) is preferably 1.5 to 2.3, more preferably about 2 and 30<H<100 $\mu$m. For finishing operations 30<H<50 $\mu$m, medium operations 40<H<80 $\mu$m and roughing operations 60<H<100 $\mu$m. In the middle 7 of the main cutting edge (FIG. 3) the W/H is preferably 0.8 to 1.6, more preferably 1.0 to 1.4 and 50<H<300 $\mu$m. For finishing operations 50<H<100 $\mu$m, medium operations 75<H<150 $\mu$m and roughing operations 100<H<300 $\mu$m. In addition, the W/H ratio in the nose area is preferably at least 1.25 times the W/H ratio on the main cutting edge and H on the main cutting edge shall be at least 1.1 times H in the nose area.

The radius on the clearance face, $R_1$, is preferably 20 to 60 $\mu$m. For finishing operations 20<$R_1$<35 $\mu$m, medium operations 25<$R_1$<50 $\mu$m and roughing operations 30<$R_1$<60 $\mu$m. The radius on the rake face, $R_2$, is preferably 100 to 250 $\mu$m.

The transition between the microgeometry in the nose area and the microgeometry in the main cutting edge shall successively take place along a length of the main cutting edge of at least 1 mm, preferably at least 1.5 mm. A transition length of about 30% of the length of the main cutting edge provides particularly favorable results.

For rhomboid inserts H and W are preferably somewhat larger in the case where the nose forms an angle >90° than in the case where the nose forms an angle <90°.

The microgeometry of the cutting tool insert according to the invention can be obtained manually using conventional grinding or machining equipment and the thus obtained cutting edge can be used for all types of inserts and all cemented carbide, cermet, i.e., titanium based carbonitride and ceramic grades. Particularly good results can be obtained for inserts with a binder phase enriched surface zone, in particular for the so-called gamma phase depleted gradients as, for example, produced according to Swedish patent applications 9200530-5 (corresponding to U.S. patent application Ser. No. 08/019,701 filed Feb. 19, 1993, abandoned in favor of Ser. No. 08/258,598 filed Jun. 10, 1994, the disclosur e of which is hereby incorporated by reference) and 9203851-2 (corresponding to U.S. patent application Ser. No. 08/159,257 filed Nov. 30, 1993, the disclosure of which is hereby incorporated by reference), the best results being obtained when the binder phase enrichment is present in the cutting edge.

The inserts according to the invention can be coated with thin wear resistant coatings according to known CVD- or PVD-techniques.

The following examples are presented to illustrate various aspects of the invention.

EXAMPLE 1

Turning inserts of the type CNMM 120412-QR with a composition according to ISO P25 and with a binder phase enriched surface zone were manufactured with the following microgeometry.

|     | nose    | main cutting edge |
| --- | ------- | ----------------- |
| W/H | 2.0     | 1.05              |
| H   | 50 μm   | 90 μm             |

As a reference insert, commercially available inserts with a binder phase enriched surface zone and with an essentially constant W/H value around the edge of 1.1 and H =75 μm were used.

The inserts were coated with $TiCN+Al_2O_3$ by CVD.

The inserts were tested in a turning operation with the following cutting data:

Work piece material: SS 2541 03

Cutting depth: 3 mm

Feed: 0.3 mm/rev

Cutting speed: 260 m/min

Type of operation: Longitudinal turning

The flank wear reached 0.25 mm after 6.4 min for the reference insert and 11.8 min for the inserts according to the invention. The toughness was the same for the reference insert and the inserts according to the invention.

EXAMPLE 2

Turning inserts of the type CNMM 120412-QR with a composition according to ISO P15 were manufactured without binder phase enrichment with the following microgeometry.

|     | nose    | main cutting edge |
| --- | ------- | ----------------- |
| W/H | 1.75    | 1.0               |
| H   | 55 μm   | 90 μm             |

The inserts according to the invention were compared with reference inserts in the form of commercially available inserts without a binder phase enriched surface zone and with an essentially constant W/H value around the edge of 1.15 and H=70 μm.

The inserts were coated with a thin coating of $TiCN+Al_2O_3+TiN$.

The toughness was tested in a turning operation with the following cutting data:

Work piece material: SS 1312

Cutting depth: 1.5 mm

Feed: 0.2–0.6 mm/rev

Cutting speed: 200 m/min

Type of operation: Longitudinal interrupted turning

The feed where 50% of the inserts were broken was determined. For the reference material this feed was 0.35 mm/rev and for the inserts according to the invention it was 0.40 mm/rev. The wear resistance was equal for both types.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An edge rounded cutting tool insert comprising at least one main cutting edge, a connecting nose area, a rake face and a clearance face, the main cutting edge having a width W of edge rounding along the rake face and a width H of edge rounding along the clearance face, a W/H ratio in the nose area being at least 1.25 times larger than the W/H ratio in a middle of the main cutting edge, the H in the middle of the main cutting edge being at least 1.1 times larger than the H in the nose area, the W/H in the middle of the main cutting edge being 1.0 to 1.6, and the W/H in the nose area being 1.5 to 2.3.

2. The cutting insert according to claim 1, wherein the cutting tool insert includes a binder phase in an inner portion and in a surface zone thereof, the surface zone having an increased binder phase content compared to the inner portion.

3. The cutting insert according to claim 2, wherein the main cutting edge has the increased binder phase content.

4. The cutting insert according to claim 1, wherein 30<H<100 μm.

5. The cutting insert according to claim 1, wherein 30<H<50 μm.

6. The cutting insert according to claim 1, wherein 40<H<80 μm.

7. The cutting insert according to claim 1, wherein 60<H<100 μm.

8. The cutting insert according to claim 1, wherein W/H in the middle of the main cutting edge is 1.0 to 1.4 and 50<H<300 μm.

9. The cutting insert according to claim 1, wherein W/H in the middle of the main cutting edge is 1.0 to 1.4 and 50<H<100 μm.

10. The cutting insert according to claim 1, wherein W/H in the middle of the main cutting edge is 1.0 to 1.4 and 100<H<300 μm.

11. The cutting insert according to claim 1, wherein the main cutting edge along the clearance face has a radius $R_1$ of 20 to 60 μm.

12. The cutting insert according to claim 1, wherein the main cutting edge along the clearance face has a radius $R_1$ of 20 to 25 μm.

13. The cutting insert according to claim 1, wherein the main cutting edge along the clearance face has a radius $R_1$ of 25 to 50 μm.

14. The cutting insert according to claim 1, wherein the main cutting edge along the clearance face has a radius $R_1$ of 30 to 60 µm.

15. The cutting insert according to claim 1, wherein the main cutting edge along the rake face has a radius $R_2$ of 100 to 250 µm.

16. The cutting insert according to claim 1, wherein a transition between microgeometry in the nose area and microgeometry in the main cutting edge extends along 30% of the main cutting edge.

17. The cutting insert according to claim 1, wherein a transition between microgeometry in the nose area and microgeometry in the main cutting edge extends along at least 1 mm of the main cutting edge.

18. A method of machining a metal workpiece with an edge rounded cutting tool insert comprising at least one main cutting edge and a connecting nose area wherein the main cutting edge has a width W of edge rounding along a rake face and a width H of edge rounding along a clearance face, a W/H ratio in the nose area of at least 1.25 times larger than the W/H ratio in a middle of the main cutting edge and the H in the middle of the main cutting edge of at least 1.1 times larger than the H in the nose area, the method comprising contacting the workpiece with the main cutting edge of the cutting tool insert and moving the workpiece relative to the cutting tool insert such that the main cutting edge removes metal from the workpiece.

19. An edge rounded cutting tool insert comprising at least one main cutting edge, a connecting nose area, a rake face and a clearance face, the main cutting edge having a width W of edge rounding along the rake face and a width H of edge rounding along the clearance face, a W/H ratio in the nose area being at least 1.25 times larger than the W/H ratio in a middle of the main cutting edge, the H in the middle of the main cutting edge being at least 1.1 times larger than the H in the nose area, the W/H in the middle of the main cutting edge being $\geq 1.0$ up to 1.6, and the W/H in the nose area being 1.5 to 2.3.

* * * * *